United States Patent
Park et al.

(10) Patent No.: US 8,302,887 B2
(45) Date of Patent: Nov. 6, 2012

(54) DRIP EMITTER

(75) Inventors: Joshua Park, Chino Hills, CA (US);
Thomas Antonucci, Azusa, CA (US);
Josh St. Vaughn, Pasadena, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 11/394,755

(22) Filed: Mar. 31, 2006

(65) Prior Publication Data

US 2006/0237561 A1    Oct. 26, 2006

Related U.S. Application Data

(60) Provisional application No. 60/666,955, filed on Mar. 31, 2005.

(51) Int. Cl.
*B05B 15/00* (2006.01)
(52) U.S. Cl. .......... 239/542; 239/547; 239/548; 405/43
(58) Field of Classification Search .................. 239/542, 239/547, 548, 533.1, 549; 405/39, 43, 45
See application file for complete search history.

(56) References Cited

U.S. PATENT DOCUMENTS

| | | | |
|---|---|---|---|
| 2,174,515 A | 10/1939 | Hughes | |
| 2,449,731 A | 9/1948 | Therrien | |
| 2,508,403 A | 5/1950 | Knauss | |
| 2,625,429 A | 1/1953 | Coles | |
| 2,639,194 A | 5/1953 | Wahlin | |
| 2,794,321 A | 6/1957 | Warner | |
| 2,873,030 A | 2/1959 | Ashton | |
| 2,970,923 A | 2/1961 | Sparman | |
| 3,155,612 A | 11/1964 | Weber | |
| 3,182,916 A | 5/1965 | Schulz | |
| 3,323,550 A | 6/1967 | Lee, Ii | |
| 3,361,359 A | 1/1968 | Chapin | |
| 3,420,064 A | 1/1969 | Blass et al. | |
| 3,434,500 A | 3/1969 | Burrows | |
| 3,467,142 A | 9/1969 | Boyle et al. | |
| 3,586,291 A | 6/1971 | Malec | |
| 3,672,571 A | 6/1972 | Goodricke | |
| 3,693,888 A | 9/1972 | Rondas et al. | |
| 3,697,002 A | 10/1972 | Parkison | |

(Continued)

FOREIGN PATENT DOCUMENTS

DD    112706 A5    5/1975

(Continued)

OTHER PUBLICATIONS

Netfim NAM Catalog Figures.*

(Continued)

*Primary Examiner* — Len Tran
*Assistant Examiner* — Trevor E McGraw
(74) *Attorney, Agent, or Firm* — Fitch, Even, Tabin & Flannery, LLP (57) ABSTRACT

A flow path is provided for a drip emitter to reduce the supply pressure in a manner reducing the potential for the flow path to become obstructed and clogged. The path employs a central path with a predetermined size and a series of baffles with predetermined spacing. The flow path further includes a metering chamber and a diaphragm to compensate for changes in supply pressure and an outlet that facilitates self-flushing in conjunction with the operation of the diaphragm.

8 Claims, 6 Drawing Sheets

U.S. PATENT DOCUMENTS

| | | | |
|---|---|---|---|
| 3,698,195 A | 10/1972 | Chapin | |
| 3,729,142 A | 4/1973 | Rangel-Garza et al. | |
| 3,753,527 A | 8/1973 | Galbraith et al. | |
| 3,777,987 A | 12/1973 | Allport | |
| 3,779,468 A | 12/1973 | Spencer | |
| 3,780,946 A | 12/1973 | Smith et al. | |
| 3,791,587 A | 2/1974 | Drori | |
| 3,804,334 A | 4/1974 | Curry | |
| 3,807,430 A | 4/1974 | Keller | |
| 3,814,377 A | 6/1974 | Todd | |
| 3,815,636 A | 6/1974 | Menzel | |
| RE28,095 E | 7/1974 | Chapin | |
| 3,851,896 A | 12/1974 | Olson | |
| 3,856,333 A | 12/1974 | Cox | |
| 3,863,845 A | 2/1975 | Bumpstead | |
| 3,870,236 A | 3/1975 | Sahagun-Barragan | |
| 3,874,598 A | 4/1975 | Havens | |
| 3,882,892 A | 5/1975 | Menzel | |
| 3,895,085 A | 7/1975 | Suzuki et al. | |
| 3,903,929 A | 9/1975 | Mock | |
| 3,948,285 A | 4/1976 | Flynn | |
| 3,954,223 A | 5/1976 | Wichman et al. | |
| 3,970,251 A | 7/1976 | Harmony | |
| 3,981,452 A | 9/1976 | Eckstein | |
| 3,993,248 A | 11/1976 | Harmony | |
| 3,998,244 A | 12/1976 | Bentley | |
| 3,998,391 A | 12/1976 | Lemelshtrich | |
| 3,998,427 A | 12/1976 | Bentley | |
| 4,008,853 A | 2/1977 | Tregillus | |
| 4,022,384 A | 5/1977 | Hoyle et al. | |
| 4,037,791 A | 7/1977 | Mullett et al. | |
| 4,047,995 A | 9/1977 | Leal-Diaz | |
| 4,077,570 A | 3/1978 | Harmony | |
| 4,077,571 A | 3/1978 | Harmony | |
| 4,084,749 A | 4/1978 | Drori | |
| 4,092,002 A | 5/1978 | Grosse et al. | |
| 4,095,750 A | 6/1978 | Gilead | |
| 4,105,162 A | 8/1978 | Drori | |
| 4,121,771 A | 10/1978 | Hendrickson | |
| 4,177,946 A | 12/1979 | Sahagun-Barragan | |
| 4,177,947 A | 12/1979 | Menzel | |
| 4,196,853 A | 4/1980 | Delmer | |
| 4,209,133 A | 6/1980 | Mehoudar | |
| 4,210,287 A | 7/1980 | Mehoudar | |
| 4,223,838 A | 9/1980 | Maria-Vittorio-Torrisi | |
| 4,226,368 A | 10/1980 | Hunter | |
| 4,235,380 A | 11/1980 | Delmer | |
| 4,250,915 A | 2/1981 | Rikuta | |
| 4,274,597 A | 6/1981 | Dobos et al. | |
| 4,307,841 A | 12/1981 | Mehoudar | |
| 4,331,293 A | 5/1982 | Rangel-Garza | |
| 4,354,639 A | 10/1982 | Delmer | |
| 4,366,926 A | 1/1983 | Mehoudar | |
| 4,369,923 A | 1/1983 | Bron | |
| 4,384,680 A | 5/1983 | Mehoudar | |
| 4,385,727 A | 5/1983 | Spencer | |
| 4,413,786 A | 11/1983 | Mehoudar | |
| 4,413,787 A * | 11/1983 | Gilead et al. ................ 239/542 |
| 4,424,936 A | 1/1984 | Marc | |
| 4,430,020 A | 2/1984 | Robbins | |
| 4,460,129 A | 7/1984 | Olson | |
| 4,473,191 A | 9/1984 | Chapin | |
| 4,473,525 A | 9/1984 | Drori | |
| 4,502,631 A | 3/1985 | Christen | |
| 4,508,140 A | 4/1985 | Harrison | |
| 4,513,777 A | 4/1985 | Wright | |
| 4,519,546 A | 5/1985 | Gorney et al. | |
| 4,534,515 A | 8/1985 | Chapin | |
| 4,572,756 A | 2/1986 | Chapin | |
| 4,573,640 A | 3/1986 | Mehoudar | |
| 4,613,080 A | 9/1986 | Benson et al. | |
| 4,626,130 A | 12/1986 | Chapin | |
| 4,627,903 A | 12/1986 | Chapman et al. | |
| 4,642,152 A | 2/1987 | Chapin | |
| 4,653,695 A | 3/1987 | Eckstein | |
| 4,687,143 A | 8/1987 | Gorney et al. | |
| 4,718,608 A | 1/1988 | Mehoudar | |
| 4,726,520 A | 2/1988 | Brown et al. | |
| 4,726,527 A | 2/1988 | Mendenhall | |
| 4,728,042 A | 3/1988 | Gorney et al. | |
| 4,735,363 A | 4/1988 | Shfaram et al. | |
| 4,749,130 A | 6/1988 | Utzinger | |
| 4,753,394 A | 6/1988 | Goodman | |
| 4,756,339 A | 7/1988 | Buluschek | |
| 4,789,005 A | 12/1988 | Griffiths | |
| 4,796,660 A | 1/1989 | Bron | |
| 4,807,668 A | 2/1989 | Roberts | |
| 4,817,875 A | 4/1989 | Karmeli et al. | |
| 4,824,019 A | 4/1989 | Lew | |
| 4,824,025 A * | 4/1989 | Miller ........................ 239/542 |
| 4,856,552 A | 8/1989 | Hiemstra | |
| 4,859,264 A | 8/1989 | Buluschek | |
| 4,874,132 A | 10/1989 | Gilead | |
| 4,880,167 A * | 11/1989 | Langa et al. ................. 239/542 |
| 4,900,437 A * | 2/1990 | Savall ........................ 210/232 |
| 4,909,411 A | 3/1990 | Uchida et al. | |
| 4,948,295 A | 8/1990 | Pramsoler | |
| 5,022,940 A | 6/1991 | Mehoudar | |
| 5,031,837 A | 7/1991 | Hanish | |
| 5,040,770 A | 8/1991 | Rajster et al. | |
| 5,052,625 A | 10/1991 | Ruskin | |
| 5,096,206 A | 3/1992 | Andre et al. | |
| 5,111,995 A * | 5/1992 | Dumitrascu et al. .......... 239/542 |
| 5,111,996 A | 5/1992 | Eckstein | |
| 5,118,042 A | 6/1992 | Delmer | |
| 5,122,044 A | 6/1992 | Mehoudar | |
| 5,137,216 A | 8/1992 | Hanish | |
| 5,163,622 A | 11/1992 | Cohen | |
| 5,183,208 A | 2/1993 | Cohen | |
| 5,192,027 A * | 3/1993 | Delmer et al. ................ 239/542 |
| 5,203,503 A | 4/1993 | Cohen | |
| 5,207,386 A * | 5/1993 | Mehoudar .................... 239/542 |
| 5,232,160 A | 8/1993 | Hendrickson et al. | |
| 5,236,130 A | 8/1993 | Hadar | |
| 5,252,162 A * | 10/1993 | Delmer ........................ 156/203 |
| 5,271,786 A | 12/1993 | Gorney | |
| 5,279,462 A | 1/1994 | Mehoudar | |
| 5,282,578 A | 2/1994 | De Frank | |
| 5,282,916 A | 2/1994 | Bloom | |
| 5,283,916 A | 2/1994 | Haro | |
| 5,324,371 A | 6/1994 | Mehoudar | |
| 5,324,379 A | 6/1994 | Eckstein | |
| 5,327,941 A | 7/1994 | Bitsakis et al. | |
| 5,330,107 A | 7/1994 | Karathanos | |
| 5,333,793 A | 8/1994 | DeFrank | |
| 5,364,032 A | 11/1994 | De Frank | |
| 5,400,973 A | 3/1995 | Cohen | |
| 5,441,203 A | 8/1995 | Swan et al. | |
| 5,443,212 A | 8/1995 | Dinur | |
| 5,586,727 A | 12/1996 | Shekalim | |
| 5,609,303 A | 3/1997 | Cohen | |
| 5,615,838 A * | 4/1997 | Eckstein et al. ........... 239/533.1 |
| 5,620,143 A | 4/1997 | Delmer et al. | |
| 5,628,462 A | 5/1997 | Miller | |
| 5,634,594 A | 6/1997 | Cohen | |
| 5,636,797 A * | 6/1997 | Cohen .......................... 239/542 |
| 5,676,897 A | 10/1997 | Dermitzakis | |
| 5,695,127 A | 12/1997 | Delmer et al. | |
| 5,732,887 A * | 3/1998 | Roberts ........................ 239/542 |
| 5,744,779 A | 4/1998 | Buluschek | |
| 5,785,785 A | 7/1998 | Delmer et al. | |
| 5,820,028 A | 10/1998 | Dinur | |
| 5,820,029 A | 10/1998 | Marans | |
| 5,829,685 A | 11/1998 | Cohen | |
| 5,829,686 A | 11/1998 | Cohen | |
| 5,855,324 A | 1/1999 | DeFrank et al. | |
| 5,875,815 A | 3/1999 | Ungerecht et al. | |
| 5,944,260 A | 8/1999 | Wang | |
| 5,957,391 A | 9/1999 | DeFrank et al. | |
| 6,015,102 A | 1/2000 | Daigle et al. | |
| 6,026,850 A | 2/2000 | Newton et al. | |
| 6,027,048 A * | 2/2000 | Mehoudar .................... 239/542 |
| 6,039,270 A | 3/2000 | Dermitzakis | |
| 6,062,245 A | 5/2000 | Berglind et al. | |
| 6,109,296 A | 8/2000 | Austin | |
| 6,116,523 A | 9/2000 | Cabahug et al. | |
| 6,120,634 A | 9/2000 | Harrold et al. | |

| | | |
|---|---|---|
| 6,179,949 B1 | 1/2001 | Buluschek |
| 6,180,162 B1 | 1/2001 | Shigeru et al. |
| 6,206,305 B1 * | 3/2001 | Mehoudar .................. 239/542 |
| 6,213,408 B1 | 4/2001 | Shekalim |
| 6,238,081 B1 | 5/2001 | Sand |
| 6,250,571 B1 * | 6/2001 | Cohen ........................ 239/542 |
| 6,280,554 B1 | 8/2001 | Lambert et al. |
| 6,302,338 B1 * | 10/2001 | Cohen ........................ 239/542 |
| 6,308,902 B1 | 10/2001 | Huntley |
| 6,343,616 B1 | 2/2002 | Houtchens |
| 6,382,530 B1 * | 5/2002 | Perkins ....................... 239/542 |
| 6,394,412 B2 | 5/2002 | Zakai et al. |
| 6,403,013 B1 | 6/2002 | Man |
| 6,460,786 B1 | 10/2002 | Roberts |
| 6,461,468 B1 | 10/2002 | Cohen |
| 6,461,486 B2 | 10/2002 | Lorincz et al. |
| 6,464,152 B1 | 10/2002 | Bolinis et al. |
| 6,499,872 B2 | 12/2002 | Sand |
| 6,513,734 B2 | 2/2003 | Bertolotti et al. |
| 6,543,509 B1 | 4/2003 | Harrold et al. |
| 6,557,819 B2 | 5/2003 | Austin |
| 6,561,443 B2 | 5/2003 | Delmer |
| 6,568,607 B2 * | 5/2003 | Boswell et al. ............. 239/542 |
| 6,581,854 B2 | 6/2003 | Eckstein et al. |
| 6,581,902 B2 | 6/2003 | Michau et al. |
| 6,622,427 B2 | 9/2003 | Breitner |
| 6,622,946 B2 | 9/2003 | Held et al. |
| 6,736,337 B2 * | 5/2004 | Vildibill et al. ............. 239/542 |
| 6,750,760 B2 | 6/2004 | Albritton et al. |
| 6,817,548 B2 | 11/2004 | Krauth |
| 6,827,298 B2 | 12/2004 | Sacks |
| 6,886,761 B2 | 5/2005 | Cohen |
| 6,896,758 B1 | 5/2005 | Giuffré |
| 6,945,476 B2 | 9/2005 | Giuffre |
| 7,048,010 B2 | 5/2006 | Golan et al. |
| 7,108,205 B1 | 9/2006 | Hashimshony et al. |
| 7,270,280 B2 | 9/2007 | Belford |
| 7,300,004 B2 | 11/2007 | Sinden et al. |
| 7,363,938 B1 | 4/2008 | Newton |
| 7,392,614 B2 | 7/2008 | Kruer et al. |
| 7,410,108 B2 | 8/2008 | Rabinowitz |
| 7,648,085 B2 | 1/2010 | Mavrakis et al. |
| 7,681,805 B2 | 3/2010 | Belford et al. |
| 7,775,237 B2 | 8/2010 | Keren |
| 7,887,664 B1 | 2/2011 | Mata et al. |
| 8,002,496 B2 * | 8/2011 | Giuffre ........................ 405/43 |
| 8,096,491 B2 | 1/2012 | Lutzki et al. |
| 2002/0070297 A1 | 6/2002 | Bolinis et al. |
| 2002/0074434 A1 | 6/2002 | Delmer |
| 2002/0104902 A1 | 8/2002 | Eckstein et al. |
| 2002/0104903 A1 | 8/2002 | Eckstein et al. |
| 2002/0113147 A1 | 8/2002 | Huntley |
| 2003/0029937 A1 * | 2/2003 | Dermitzakis et al. ......... 239/542 |
| 2003/0042335 A1 | 3/2003 | Krauth |
| 2003/0057301 A1 | 3/2003 | Cohen |
| 2003/0089409 A1 | 5/2003 | Morimoto |
| 2003/0090369 A1 | 5/2003 | Albritton et al. |
| 2003/0226913 A1 | 12/2003 | Brunnengraeber et al. |
| 2004/0164185 A1 | 8/2004 | Giuffre |
| 2005/0029231 A1 | 2/2005 | Kertscher et al. |
| 2005/0103409 A1 | 5/2005 | Weber |
| 2005/0133613 A1 | 6/2005 | Mayer et al. |
| 2005/0224607 A1 | 10/2005 | Dinur et al. |
| 2005/0258278 A1 | 11/2005 | Cohen |
| 2005/0258279 A1 | 11/2005 | Harrold |
| 2005/0279866 A1 | 12/2005 | Belford |
| 2005/0284966 A1 * | 12/2005 | DeFrank ..................... 239/542 |
| 2006/0043219 A1 | 3/2006 | Raanan |
| 2006/0144965 A1 | 7/2006 | Keren |
| 2006/0163388 A1 * | 7/2006 | Mari ............................ 239/542 |
| 2006/0186228 A1 | 8/2006 | Belford et al. |
| 2006/0202381 A1 | 9/2006 | Bach et al. |
| 2007/0095950 A1 | 5/2007 | Kim |
| 2007/0108318 A1 | 5/2007 | Mamo et al. |
| 2007/0138323 A1 | 6/2007 | Lee |
| 2007/0187031 A1 | 8/2007 | Kertscher |
| 2007/0194149 A1 * | 8/2007 | Mavrakis et al. ............ 239/542 |
| 2008/0041978 A1 | 2/2008 | Keren |
| 2008/0067266 A1 | 3/2008 | Cohen |
| 2008/0099584 A1 | 5/2008 | Raanan |
| 2008/0105768 A1 | 5/2008 | Kertscher |
| 2008/0237374 A1 | 10/2008 | Belford et al. |
| 2008/0257991 A1 | 10/2008 | Einav et al. |
| 2009/0159726 A1 | 6/2009 | Thompson et al. |
| 2009/0165879 A1 | 7/2009 | Socolsky |
| 2009/0173811 A1 | 7/2009 | Gorney et al. |
| 2009/0261183 A1 | 10/2009 | Mavrakis et al. |
| 2009/0302127 A1 | 12/2009 | Lutzki et al. |
| 2009/0314377 A1 | 12/2009 | Giuffr |

FOREIGN PATENT DOCUMENTS

| | | |
|---|---|---|
| EP | 0444425 A1 | 4/1991 |
| EP | 0730822 A2 | 9/1993 |
| EP | 0709020 A1 | 5/1996 |
| IL | 53463 A | 3/1983 |
| WO | WO9221228 A1 | 12/1992 |
| WO | WO9427728 A1 | 12/1994 |
| WO | WO9810635 A1 | 3/1998 |
| WO | WO9918771 A1 | 4/1999 |
| WO | WO9955141 | 11/1999 |
| WO | WO0001219 A1 | 1/2000 |
| WO | WO 00/10378 | 3/2000 |
| WO | W00030760 | 6/2000 |
| WO | WO0030760 | 6/2000 |
| WO | 0136106 A1 | 5/2001 |
| WO | WO0204130 A1 | 1/2002 |
| WO | 03045577 A1 | 6/2003 |
| WO | 03066228 A1 | 8/2003 |
| WO | 2007068523 A1 | 6/2007 |

OTHER PUBLICATIONS

NAM Invoice Jan. 31, 1991.*
Jaffe, E., Netafim Ltd., Patent Dept.; Letter w/attachment, Feb. 4, 2008, 7 pp.
Jaffe, E., Netafim Ltd., Patent Dept.; Letter w/attachment, May 7, 2008, 2 pp.
Jaffe, E., Netafim Ltd., Patent Dept.; Letter w/attached claim charts, Jul. 12, 2009, 4 pp.
Netafim Ltd., Appendix A, marked-up images of Netafim's Ram product, 1 p.
Netafim Ltd., Appendix B, Invoice, Jan. 31, 1991, 1 p.
Netafim Ltd., Appendix C, Netafim RAM Catalog, Jan. 2000, 4 pp.
Netafim Ltd., Appendix D, Enlarged, marked-up excerpts from Netafim RAM Catalog, Jan. 2000, 1 p.
Jaffe, E., Netafim Ltd., Patent Dept.; Letter w/attached claim charts, Feb. 4, 2008, 6 pp.
Netafim Ltd., Appendix A, images of Netafim's Drip Net product, 1 p.
Hetzler, Mark W., Fitch, Even, Tabin & Flannery; Letter, Apr. 23, 2008, 1 p.
Jaffe, E., Netafim Ltd., Patent Dept.; Letter w/attached invoice, May 7, 2008, 2 pp.
Jaffee, E., Netafim Ltd., Patent Dept., Letter w/attached Appendices A-B, Aug. 1, 2010, 35 pp.
U.S. Appl. No. 11/359,181, filed Feb. 22, 2006 and issued on Jan. 19, 2010 as U.S. Patent No. 7,648,085, entitled "Drip Emitter".
U.S. Appl. No. 12/495,178, filed Jun. 30, 2009, entitled "Drip Emitter," which is a continuation of U.S. Appl. No. 11/359,181.
U.S. Appl. No. 12/495,193, filed Jun. 30, 2009, entitled "Drip Emitter," which is a divisional of U.S. Appl. No. 11/359,181.
U.S. Appl. No. 12/436,394, filed May 6, 2009, entitled "Drip Emitter and Methods of Assembly and Mounting".
EPO search report, EPO Application No. 10160675.4, mailed Aug. 6, 2010.
U.S. Appl. No. 12/347,266, filed Dec. 31, 2008, entitled "Low Flow Irrigation Emitter".
Office Action, U.S. Appl. No. 12/347,266, mailed Sep. 7, 2010.
Office Action, U.S. Appl. No. 12/347,266, mailed Nov. 17, 2010.
Office Action, U.S. Appl. No. 12/347,266, mailed Mar. 7, 2011.
U.S. Appl. No. 12/367,295, filed Feb. 6, 2009, entitled "Low Flow Irrigation Emitter".
Office Action, U.S. Appl. No. 12/367,295, mailed Feb. 11, 2011.
Office Action, U.S. Appl. No. 12/367,295, mailed Jul. 15, 2011.

Office Action, U.S. Appl. No. 12/495,178, mailed Feb. 3, 2010.
Office Action, U.S. Appl. No. 12/495,193, mailed May 11, 2011.
USPTO Office Action in U.S. Appl. No. 12/495,193, mailed on Jan. 6, 2012.

Letter dated Mar. 20, 2012, addressed to Mr. Mark Hetzler from Womble Carlyle Sandridge & Rice with Exhibits A and B.

* cited by examiner

DRIP EMITTER

CROSS-REFERENCE TO RELATED APPLICATION

This application claims the benefit of U.S. Provisional Application No. 60/666,955, filed Mar. 31, 2005, which is hereby incorporated herein by reference in its entirety.

FIELD OF THE INVENTION

This invention relates to the design of a drip irrigation emitter and, more particularly, to an improved flow path system for a drip irrigation emitter to reduce pressure and reduce clogging.

BACKGROUND OF THE INVENTION

Drip irrigation is commonly used to supply irrigation to landscaping and crops. Drip irrigation emitters are generally known in the art for use in delivering irrigation water to a precise point at a predetermined and relatively low flow rate, thereby conserving water. The drip emitter taps a portion of the relatively high pressure irrigation water from a supply tube for flow through a typically long tortuous flow duct path to achieve a desired pressure drop prior to discharge at a target trickle or drip flow rate.

In a conventional system, a large number of drip emitters are mounted at selected positions along the length of the irrigation supply tube to deliver the irrigation water to a large number of specific points, such as directly to a plurality of individual plants. More specifically, a number of drip emitters are fitted into a conduit and spaced apart at appropriate distances depending on the desired amount of irrigation. Each emitter includes an inlet to receive water flowing through the conduit, an outlet to emit water from the conduit at a specific rate for irrigation, and a body member intermediate the inlet and the outlet and that defines the flow duct path.

Tortuous flow duct paths generally include a number of alternating, flow baffles defining a flow channel and causing frequent, regular, and repeated directional changes in water flow. Accordingly, the water flow takes on a back and forth zigzag pattern. The water experiences multiple directional changes as it is constantly redirected through the tortuous flow duct path. This repeated redirection significantly reduces the water pressure and water flow by the time the water reaches the end of the flow duct path.

Experience, however, has revealed that pressure compensating drip emitters may get clogged during operation when they are exposed to water with contaminants. Organic agents and grit, such as algae, also can clog up an emitter and cause the emitter to be unusable. Algae can accumulate in the emitter path both as a result of entering with the water and from growth inside the emitter. Thus, even if the flow path through the emitter is sufficient to pass grit along, it may not pass the grit if algae is present. Accordingly, there is desired a design that permits enhanced flow through the emitter of organic materials, grit and algae to reduce the amount of obstruction and the tendency of emitter clogging.

Further, it has been determined that drip emitters tend to become obstructed in the tortuous flow path when grit tends to become lodged between alternating baffles. Also, even more commonly, drip emitters tend to become obstructed near the emitter outlet. Accordingly, there is desired a design that reduces the obstruction of the emitter at both of these locations.

DESCRIPTION OF THE PREFERRED EMBODIMENT

Figure 1:
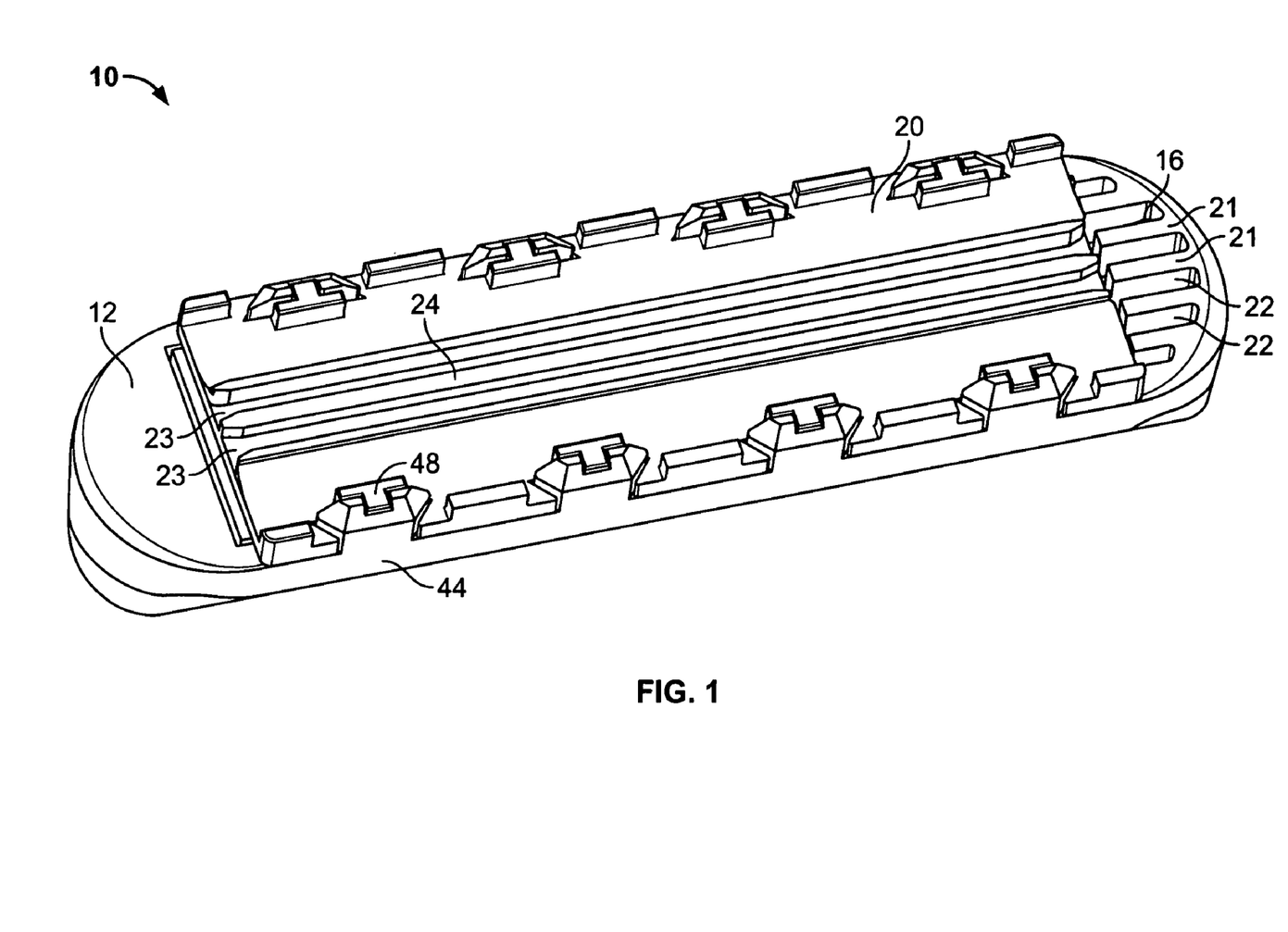
FIG. 1 is a top perspective view of a drip emitter embodying features of the present invention.
Figure 2:
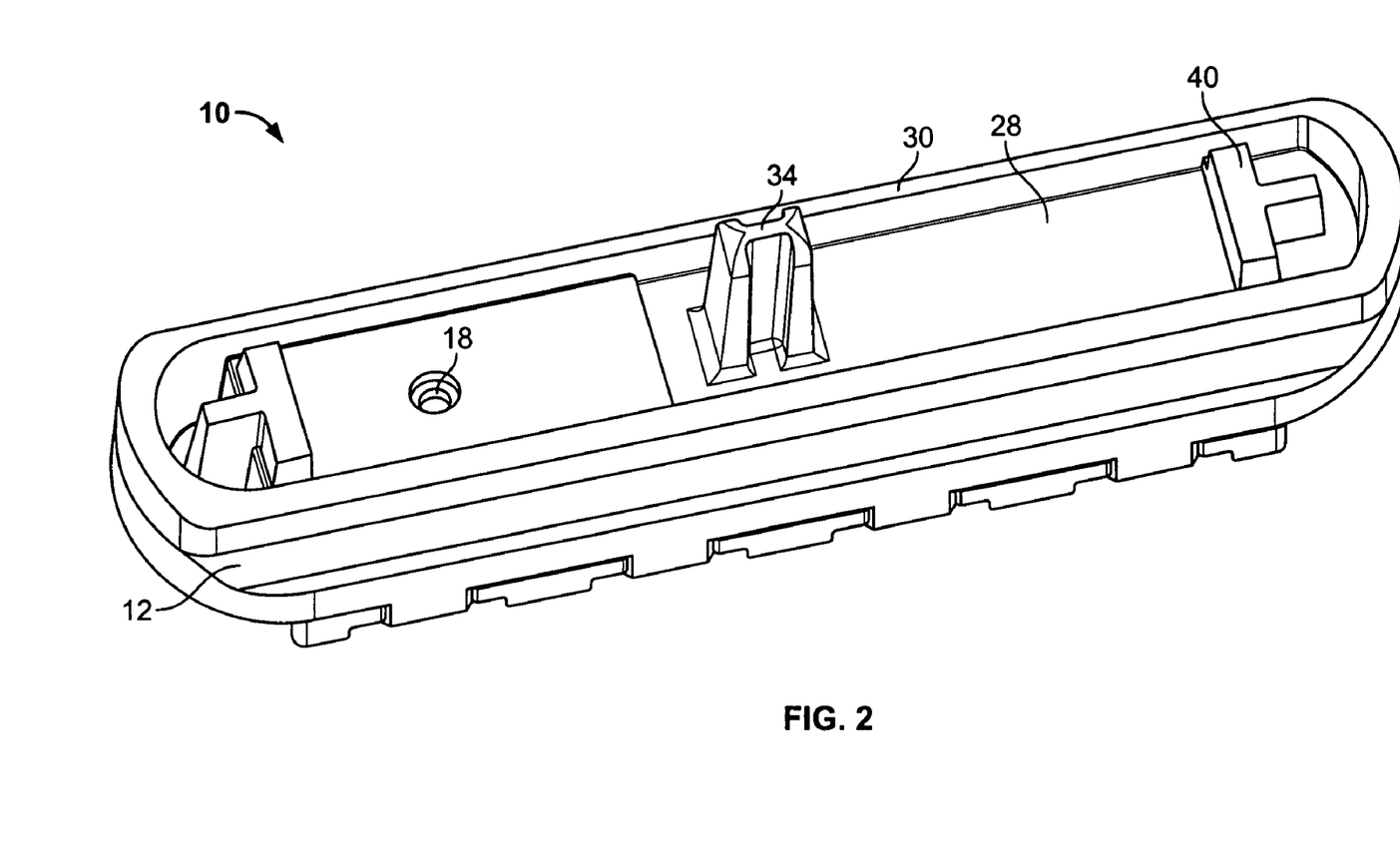
FIG. 2 is a bottom perspective view of the drip emitter of FIG. 1.
Figure 3:
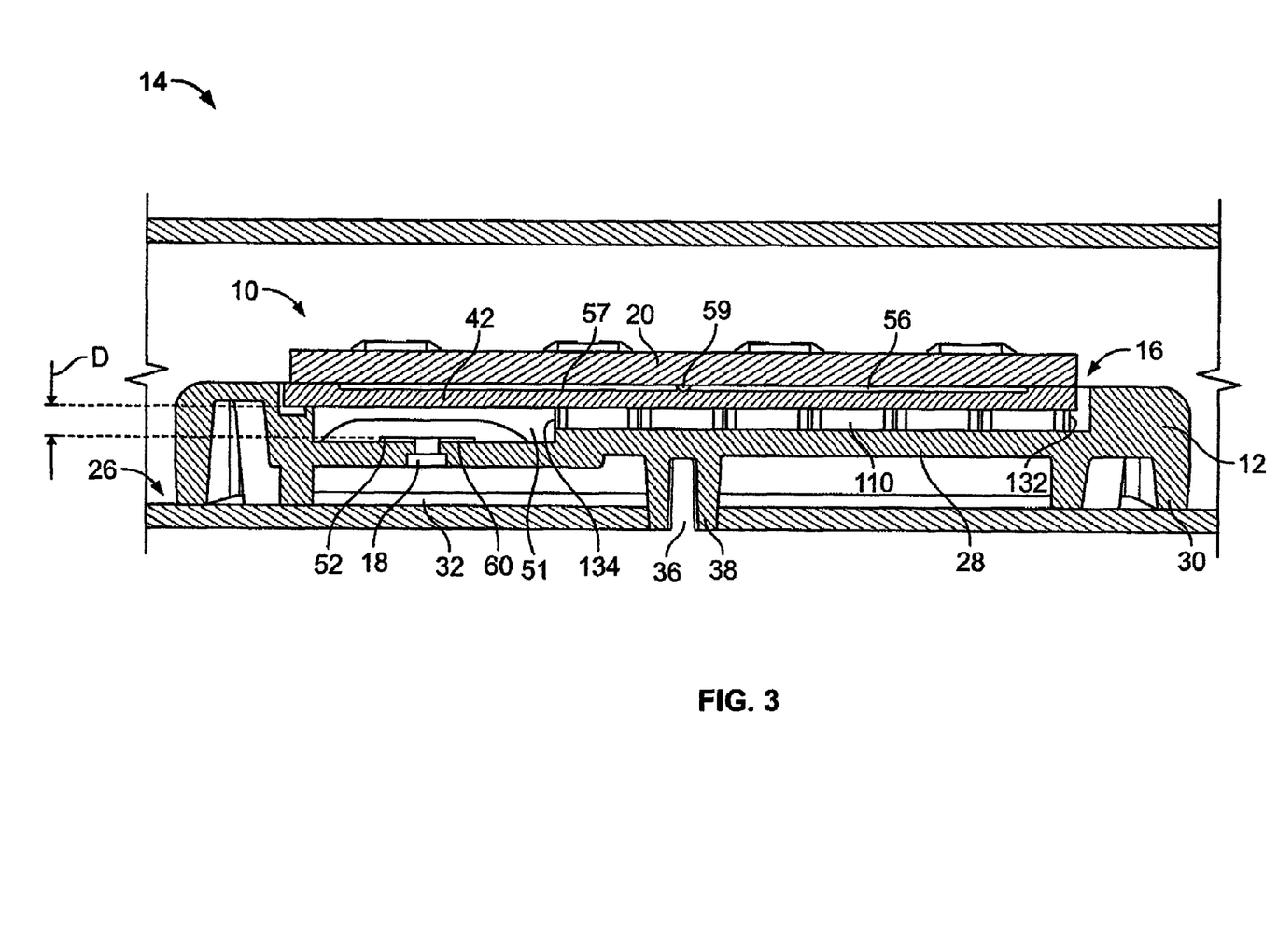
FIG. 3 is a cross-sectional view of the drip emitter of FIG. 1 showing the emitter mounted in an irrigation supply tube.

With reference to FIGS. 1 and 2, there is illustrated a preferred embodiment of an emitter 10. The emitter 10 includes a housing 12 and a cover 20. An inlet 16 is disposed at one end of the emitter 10 for tapping a portion of the water flow from the irrigation tube 14 (FIG. 3). The housing 12 includes a series of longitudinally extending fins 21 that define a plurality of grooves 22 at the inlet 16. The fins 21 act to filter out grit and debris that might otherwise clog the emitter 10. The inlet 16, however, may include any design of opening or openings in the emitter housing 12, such as various numbers and arrangements of fins, grooves and holes, that allow access to the interior of the housing 12 and may be located at various points on the emitter housing 12.

The housing cover 20 defines two slots 23 extending centrally and longitudinally in its top surface and separated by guide rib 24 for mounting each emitter 10 to the inside wall 26 of the supply tube 14. Other orientations and arrangements of slots 23 and guide ribs 24 may be used. During assembly, each emitter 10 is mounted to the inside wall 26 of tube 14, as shown in FIG. 3. More specifically, an insertion device, such as an emitter insertion guide, carries the emitter 10 into the tube 14 as it is being formed. The tube 14 is formed around the emitter 10 and presses against the housing cover 20 of each emitter 10 such that the housing base 28 of the emitter 10 engages the inside wall 26. The slots 23 and guide rib 24 cooperate with complementary rails on the emitter insertion guide to provide stability and maintain proper orientation of the emitter 10 as it is inserted and mounted to the inside wall of the tube 14.

The housing base 28 defines an outlet 18 at the opposite end of the emitter 10 as the inlet 16. The base 28 also preferably includes a raised rim 30 extending about its perimeter. The raised rim 30 is used to mount the emitter 10 to the inside surface 26 of the irrigation tube 14 by acting as an attachment zone. More specifically, during assembly, the raised rim 30 of each is pressed into sealing engagement with the inside surface 26 of the irrigation tube 14, as shown in FIG. 3, as the tube 14 is being formed around the emitter 10 being inserted. The raised rim 30 forms a gap between the surface of the housing base 28 inside the raised rim 30 and the inside surface 26 of the tube 14. The gap forms an outlet bath 32 for the discharge of water from the outlet 16 of the emitter 10.

As shown in FIGS. 2 and 3, the housing base 28 also preferably includes an elongated protrusion, or chimney 34, having an I-shaped cross-section. The chimney 34 is adapted to push outwardly against the tube wall 26 during assembly, thereby forming an area of the irrigation tube 14 that bulges outward. The tube 14 then passes under a cutting tool that cuts the bulging tube portion and projecting end of the chimney 34 to form an outlet 36 through the wall 26 of the irrigation tube 14 for watering. The remaining uncut chimney portion 38 extends between the housing base 28 and through the tube outlet 36, allowing water to flow to terrain outside the tube 14. More specifically, water exiting the emitter 10 through the outlet 18 flows into the outlet bath 32 and trickles out to the terrain to be irrigated through the elongated channels formed by the I-shaped cross-section of the remaining chimney portion 38 and the supply tube outlet 36.

With reference to FIG. 2, two T-shaped mounts 40 located at the end portions of the housing base 28 also are preferably used in mounting the housing base 28 to the inner surface 26 of the irrigation tube 14. The T-shaped mounts 40 assist in securing the emitter 10 to the irrigation tube 14 and provide additional mounting support in addition to the raised rim 30. The T-shaped mounts 40 also provide structural integrity to the emitter 10 for resisting forces exerted by water flowing in the irrigation tube 14 and forces exerted as a result of use of the chimney 34 in the formation of the outlet 36 in the tube wall 26. These chimney and mounting features are discussed in more detail in U.S. patent application Ser. No. 11/359,181, assigned to the assignee of the present invention, which is incorporated herein by reference.

Figure 4:
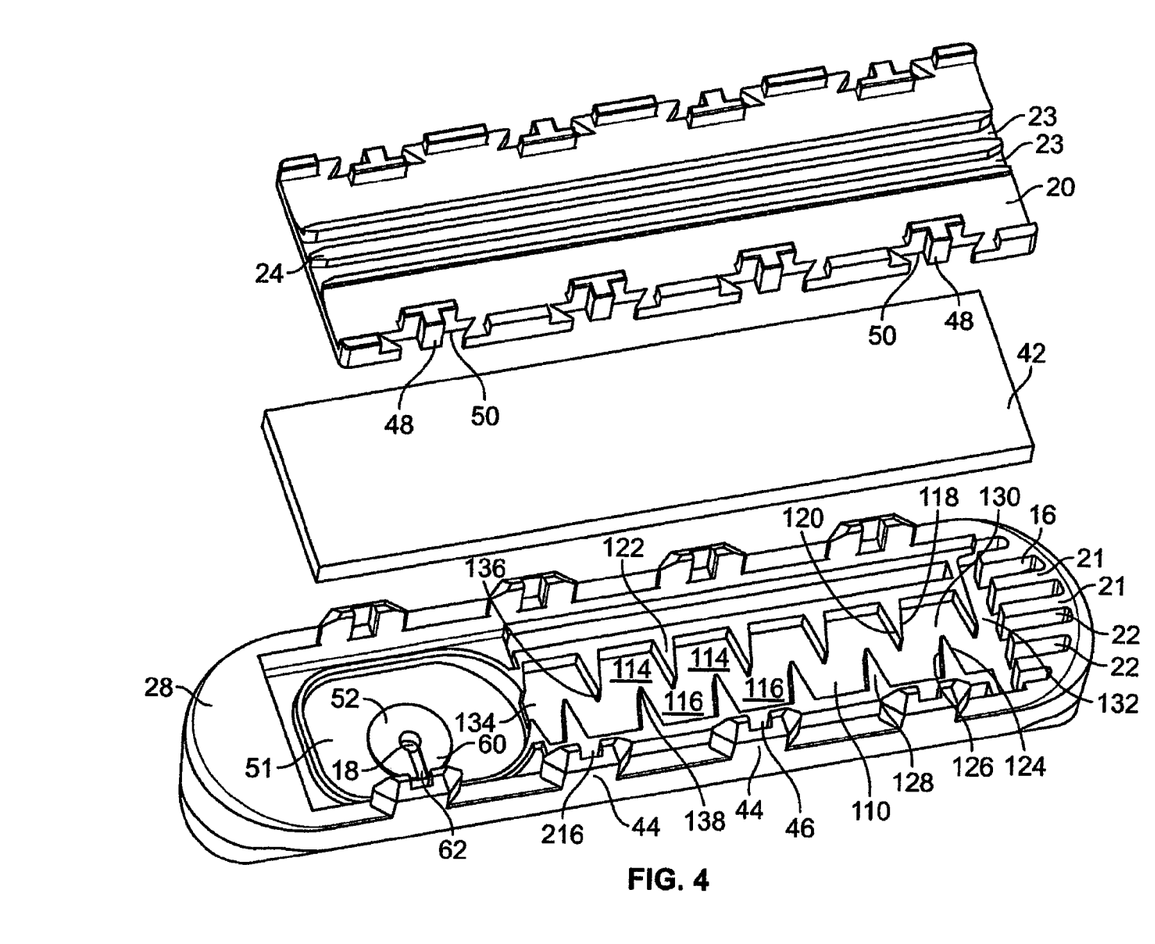
FIG. 4 is an exploded top perspective view of the drip emitter of FIG. 1.

As shown in FIG. 4, the housing cover 20 and the housing base 28 may be plastic molded components. The housing cover 20 and the housing base 28 are adapted for easy assembly and define a substantially enclosed housing interior. A diaphragm 42 is disposed in the housing interior between the housing cover 20 and the housing base 78.

A plurality of arms 44 extend from the perimeter of the longitudinal sides of the housing base 28. The arms 44 define slots 46 for interlocking engagement with complementarily shaped tabs 48 in recesses 50 disposed along the perimeter of the housing cover 20. The housing cover 20 and the housing base 28 engage one another, preferably by heat bonding, to cause the diaphragm 42 to sealingly engage the interior of the housing base 28. As should be evident, numerous other structures and attachment methods may be used to couple the housing cover 20 and the base portion 28 together and to seal the diaphragm 42 therebetween.

Figure 5:
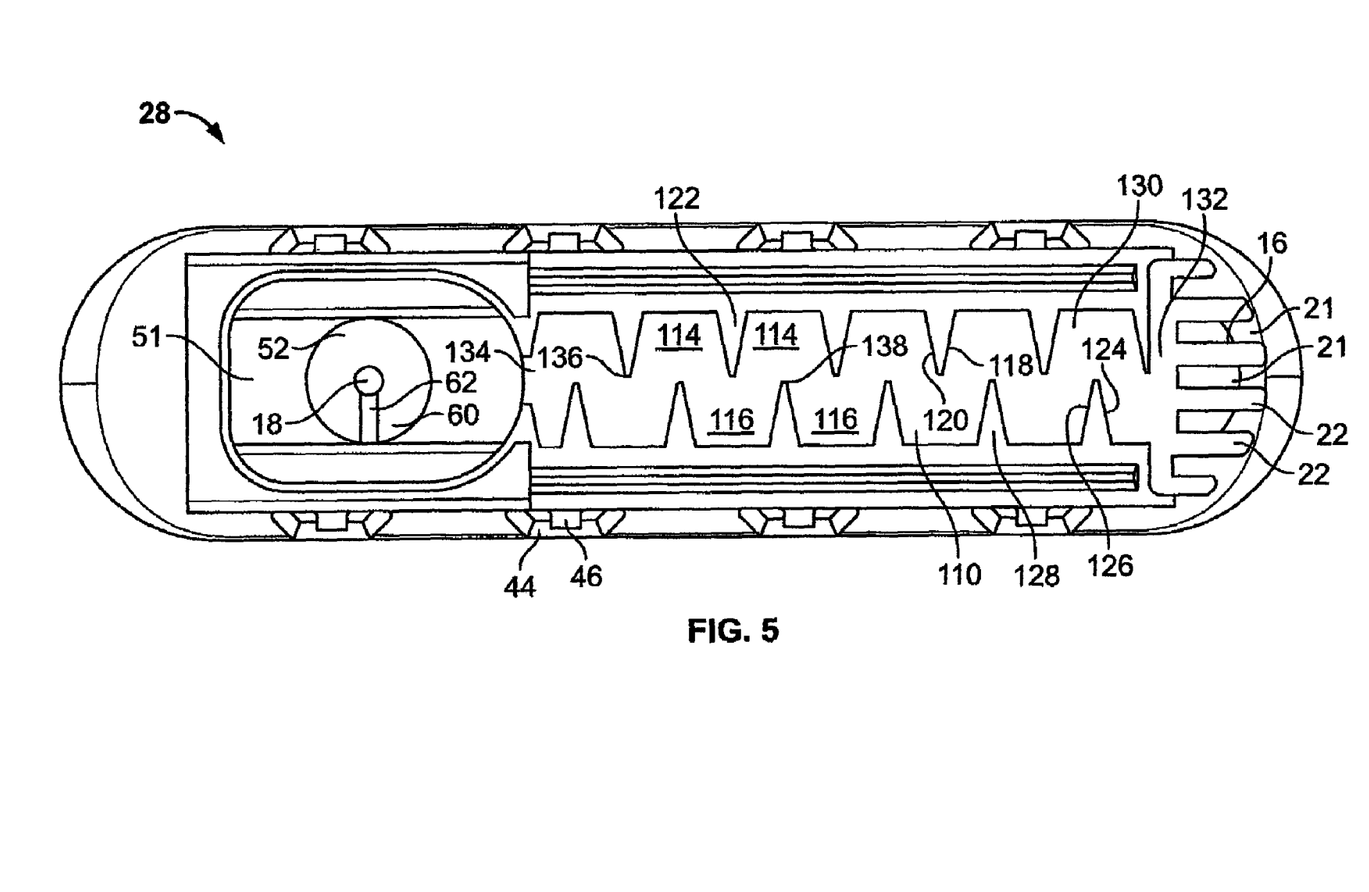
FIG. 5 is a top plan view of a lower housing of the drip emitter of FIG. 1 showing a flow duct path.

As shown in FIG. 5, the interior surface of the housing base 28 and the diaphragm 42 define an internal flow path through the emitter 10 from the inlet 16 to the outlet 18. The diaphragm 42 is preferably an elongated strip dimensioned to overlap and seal against the flow path and is preferably a silicone or rubber material. Alternatively, the diaphragm 42 may be arcuate in shape to accommodate alternative embodiments of the drip emitter having curved, circular, and/or three-dimensional flow duct paths.

The housing base 28 defines a flow duct path 110 and a water metering chamber 51. More specifically, water flows from the inlet 16, through the flow duct path 110, and into the water metering chamber 51. It then flows through a groove 62, defined by a water metering surface 52 on the bottom of the watering meter chamber 51, to the emitter outlet 18. Water flowing through this flow path experiences a pressure drop.

Figure 6:
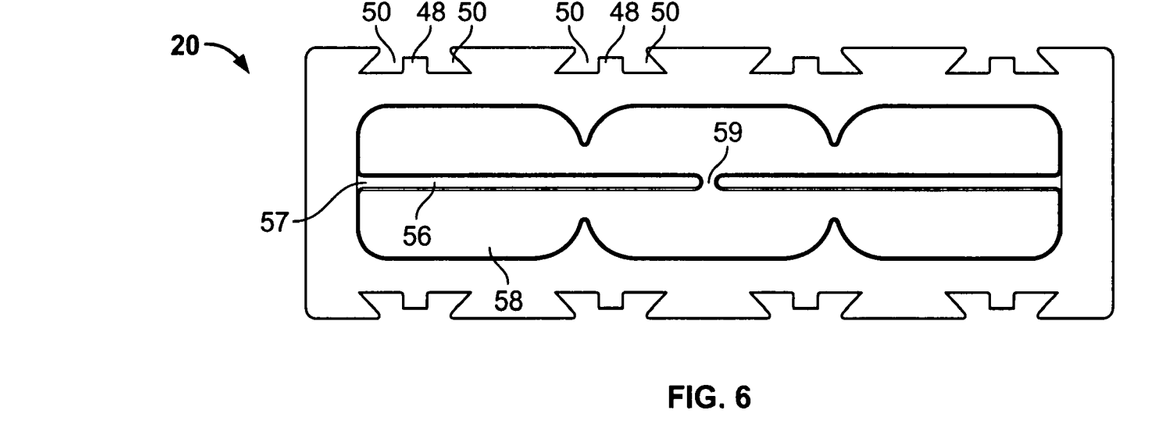
FIG. 6 is a bottom plan view of an upper housing of the drip emitter of FIG. 1.

As shown in FIG. 6, the interior surface of the housing cover 20 defines an elongated, central channel 56 forming a pressure chamber 57 between the housing cover 20 and the diaphragm 42. The interior surface of the housing cover 20 does not have a complete sealing engagement with the diaphragm 42, so that water therefore enters and accumulates in the pressure chamber 57 through a gap between the housing cover 20 and the diaphragm 42 at the inlet and outlet ends. The water in this channel 56 does not flow through the emitter 10. Instead, water accumulates in the channel 56 at the same general pressure as water flowing in the conduit 14.

Although the pressure chamber 57 need not necessarily be in the shape of an elongated channel 56, such a channel is desirable to limit the entry of grit and other debris into the region between the housing cover 20 and the diaphragm 42. The accumulation of grit could otherwise interfere with the flexing of the diaphragm 42. Also, the channel 56 preferably includes a stop 59 at or near the center of the channel 56 to limit the flow of grit and other debris therethrough.

The interior surface of the housing cover 20 preferably includes a generally central raised region 58 which engages the diaphragm 42 and spaces the diaphragm 42 away from the perimeter region of the interior surface. The raised region 58 defines the channel 56, which extends centrally through this raised region 58.

Water accumulating in the channel 56 presses down against the diaphragm 42, thereby flexing and deflecting the diaphragm 42 toward and against the water metering surface 52. This creates a pressure differential between water in the pressure chamber 57 and water in the metering chamber 51. The water metering surface 52 includes a raised circular portion, or island 60, with the groove 62 providing a flow path across the island 60 to the emitter outlet 18. During normal operation, the diaphragm 42 deflects into the groove 62 in response to fluctuations in supply tube pressure. This deflection into the groove 62 compensates for such pressure fluctuations and maintains a relatively constant drip flow rate. This pressure differential also improves a self-flushing ability of the emitter 10, as described further below.

Figure 7:
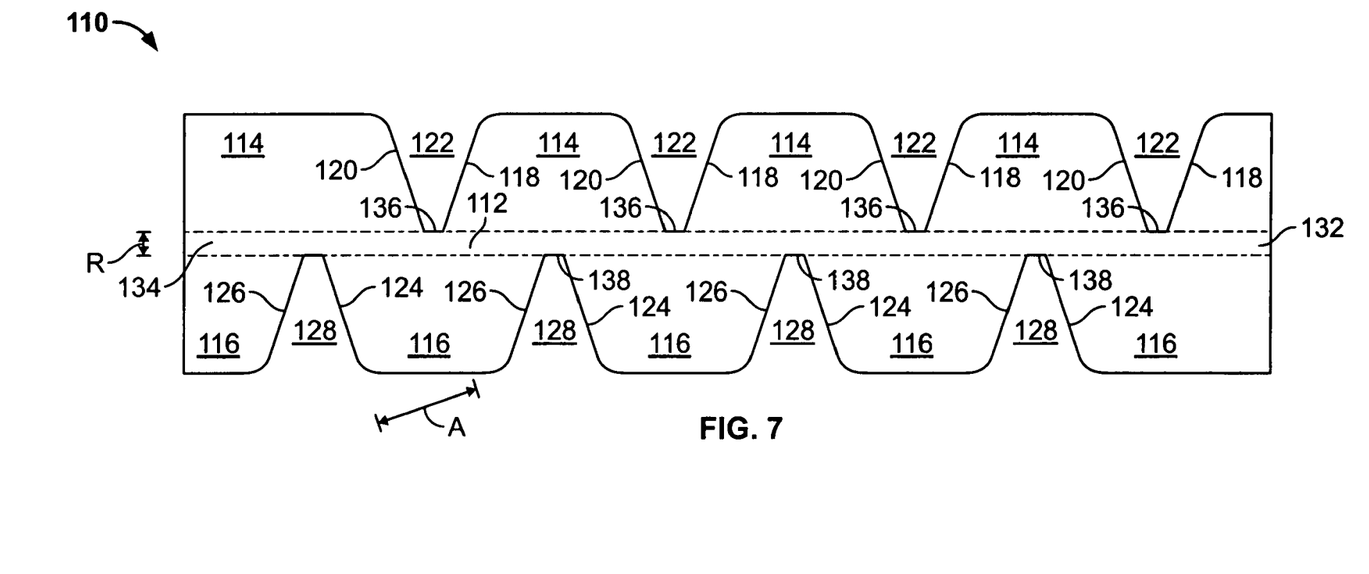
FIG. 7 is a schematic plan view of the flow duct path of the drip emitter of FIG. 1.

With reference to FIGS. 4, 5, and 7, the flow duct path 110 provides a zigzagging tortuous path for the water flow to reduce the pressure of the water. The path is defined by a first set of baffles 122 and second set of baffles 128 opposing the first set 122. A small, central, elongated path 112 of preferably substantially rectangular cross-sectional shape extends directly through and between the baffles sets without any directional changes. The central path 112 divides the flow duct path 110 into two sets of laterally extending flow recesses 114 and 116, defined by the first set of baffles 122 and the second set of baffles 128, respectively.

More specifically, each of the flow recesses of one set 114 is defined between a pair of opposing side walls 118, 120 of a pair of successive baffles 122 of the first set of baffles 122. Each of the other flow recesses from the other set 116 is defined between a pair of opposing side walls 124, 126 of a successive pair of baffles 128 of the second set of baffles 128. The flow duct path 110 has a base wall 130. The flow duct 110 has an inlet 132 and an outlet 134 at the opposite end.

The central path 112 and the recesses 114, 116 define the tortuous path for the water to travel through the emitter 10. The size of the tortuous path is an influential factor in determining the flow rate from the emitter 10 at any given operating pressure. An emitter 10 with an appropriate center path 112 reduces the amount of clogging by letting organic materials and grit, such as algae, to flow through the emitter 10 with decreased amount of obstruction by the baffles 122, 128.

Each baffle of the two sets of baffles 122 and 128 has a terminal edge, or truncated tip 136 and 138, respectively. The baffles 122, 128 are arranged so that the tip 136 of one baffle 122 on one side of the center flow path 112 points to the midpoint between the tips 138 of two successive baffles 128 on the opposite side of the center flow path 112. A baffle pitch "A" is defined as the distance between one side wall 120 of one baffle 122 on one side of the flow path 112 to the closest successive side wall 124 of another baffle 128 on the other side of the flow path 112. The tips of successive baffles that are on the same side of the central flow path 112 are aligned in a collinear manner along a border of the flow path 112.

The width or gap "R" of the center path 112 is defined as the distance between an imaginary line connecting the tips 136 on one side of the flow path 112 and another imaginary line connecting the tips 138 that are on the other side of the flow path 112. The preferred dimension of R lies in the range of greater than 0, but less than or equal to 0.19 times the baffle pitch A. As an alternative to the linear flow duct path 110 described above, the flow duct path 110 may be disposed in an arcuate, circular, and/or three-dimensional fashion (such as, for example, the layout of the flow duct path shown in U.S. Pat. No. 5,820,029, assigned to the assignee of the present invention, which is incorporated herein by reference), while retaining the same relationship of A and R.

The range where $0<R\leq0.19A$ provides a flow duct path geometry that reduces obstruction of the emitter 10 both in the flow duct path 110 and at or near the emitter outlet 18 and thereby improves self-flushing. Without a central flow path 112, grit would tend to become lodged in or near the baffles 122, 128, resulting in obstruction of the flow duct path 110. It should be evident that other forms of the flow duct path 110 are available incorporating the spatial relationships described above, including the relationship between baffle pitch, A, and width of the center gap, R.

When the emitter 10 is obstructed due to grit becoming lodged in the groove 62 of the water metering surface 52, the pressure differential between the pressure chamber 57 and the water metering chamber 51 is eliminated and other forces become significant. The concept of "lift ratio" describes these other forces. The lift ratio is defined as $F_P/F_R$, where $F_P$ is the pull force exerted by the emitter outlet 18 on the diaphragm 42, and $F_R$ is the elastic return force of the diaphragm 42. More specifically, $F_P=(\Pi/4)*(diameter^2)*(supply$ tube water pressure−atmospheric pressure), where the diameter is the diameter of the emitter outlet 18, and $F_R=k*D$, where k=the spring constant of the diaphragm 42 and D=the amount of deflection of the diaphragm 42. During normal operation, the amount of deflection is the distance between the diaphragm 42 in its relaxed state and the top of the water metering surface 52 because the diaphragm 42 is designed to bottom out on the metering surface 52 so that it can interact with the groove 62.

The lift ratio describes the interaction of the two forces that are acting at the water metering surface 52 and the emitter outlet 18 when the emitter 10 is obstructed. $F_P$ is the force that "grabs" the diaphragm 42 and holds it at or near the emitter outlet 18 even when there is no flow along the flow path due to grit obstructing the metering groove 62. $F_R$ is the force reflecting the tendency of the diaphragm 42 to spring back to its relaxed position away from the metering surface 52 when there is an obstruction. It is most advantageous, in order to improve self-flushing of the emitter 10, to reduce the lift ratio as much as possible within practical limits of emitter design so that $F_R$ is greater than $F_P$ to enable the diaphragm 42 to move away for flushing of the metering groove 52.

Consideration of the formulas for $F_P$ and $F_R$ reveals that there are two general factors that help return the diaphragm 42 to its relaxed position when the emitter 10 is obstructed and thereby improve the self-flushing ability of the emitter 10: (1) the amount of deflection, D, by the diaphragm 42; and (2) the size of the diameter for the emitter outlet 18. First, the amount of deflection by the diaphragm 42 is a significant factor. For diaphragms with the same physical properties such as dimension, elongation, and modulus, a higher degree of diaphragm deflection depth will tend to return to the diaphragm 42 back to its relaxed position quicker due to higher elastic force.

When the pressure differential between the pressure chamber 57 and water metering chamber 51 is suddenly eliminated, a greater deflection of the diaphragm 42 will result in a greater tendency of the diaphragm 42 to return to its relaxed position. This would allow any debris trapped between the water metering surface 52 and the diaphragm 42 to flow.

Second, the size of the diameter of the emitter outlet 18 is another factor. As the water flows in the tortuous flow duct path 110, the water pressure in the flow path drops, resulting in the pressure differential between water in the pressure chamber 57 and water metering chamber 51. This pressure differential causes the higher pressure water in the pressure chamber 57 to push the diaphragm 42 towards and against the water metering surface 52. When the emitter 10 becomes obstructed, the pressure differential is eliminated and the diaphragm 42 will tend to return to its relaxed position. However, if the pressure difference between the tube pressure and the atmospheric pressure (the pressure on the outside of the emitter outlet 18) is too great, the diaphragm 42 may not return to its relaxed position until the tube pressure is significantly reduced, such as by eliminating water flow through the supply tube 14 entirely. It is not desirable to adjust the line pressure and is preferred that the emitter 10 address this situation in an automatic manner. To address this situation, it is desirable to reduce the diameter of the emitter outlet 18 and thereby reduce $F_P$, that is, the "grabbing" of the diaphragm 42. The reduction in diameter of the emitter outlet 18 is limited by practical design considerations, but emitter outlets 18 having a diameter as small as 0.030 inches have been found to satisfactorily self-flush without changing the supply pressure.

To decrease the lift ratio, the amount of deflection, D, of the diaphragm 42 (the distance between the diaphragm at rest and the top of the water metering surface 52) is increased by increasing the pressure differential between the pressure chamber 57 and the water metering chamber 51. A relatively small pressure in the water metering chamber 51 will result in a greater deflection of the diaphragm 42. Thus, it is desirable to increase the pressure drop through the flow duct path 110 within design limits, such as emitter length and cost.

To achieve this relatively large pressure drop, the central flow path 112 through the flow duct path 110 must be relatively narrow, $R\leq0.19A$. A narrow central flow path 112 results in a greater pressure drop than a wider central flow path 112, and therefore, a lower lift ratio and less obstruction in the groove 62 near the emitter outlet 18. Thus, although a wide central flow path 112 tends to reduce clogging of the flow duct path 110, it results in an increased tendency for clogging near the emitter outlet 18. Clogging near the emitter outlet 18 is a more common problem than clogging of the flow duct path 110.

Also, to decrease the lift ratio, the diameter of the emitter outlet 18 is reduced within emitter design limits. To decrease lift ratio, the ratio of the diameter of the emitter outlet 18 to the amount of deflection, D, of the diaphragm 42 to the (diameter/deflection) is minimized. The ratio of the diameter to deflection, D, should preferably be less than one.

The foregoing relates to preferred exemplary embodiments of the invention. It is understood that other embodiments and variants are possible which lie within the spirit and scope of the invention as set forth in the following claims.

What is claimed is:

1. A drip emitter comprising:
   a housing defining an emitter inlet and an emitter outlet downstream of the emitter inlet, the emitter inlet adapted to receive fluid under pressure from a supply tube and the emitter outlet adapted to emit fluid;

a flow path extending through the housing from the emitter inlet to the emitter outlet, the flow path including a pressure reducing flow duct;

the pressure reducing flow duct comprising:

a duct inlet and a duct outlet located downstream of the duct inlet and having an unobstructed central region with a width (R);

a first set of baffles located adjacent to one side of the central region and a second set of baffles located adjacent to the other side of the central region, each baffle having a pair of side wall portions with the baffles of each set extending from a common wall and with each baffle terminating in a baffle edge;

wherein the one side of the central region is defined by a first generally linear imaginary line connecting the edges of the first set of baffles and the other side of the central region is defined by a second generally linear imaginary line connecting the edges of the second set of baffles and wherein (R) is the minimum distance between the first and second imaginary lines; and a first set of flow recesses defined by the first set of baffles adjacent to one side of the central region and a second set of flow recesses defined by the second set of baffles adjacent to the other side of the central region, each flow recess defined at least in part by opposing side wall portions from successive baffles;

a diaphragm overlaying and forming at least a portion of the pressure reducing flow duct; and a pressure chamber defined by at least one elongated channel in an interior surface of the housing and by the diaphragm, and separated from the pressure reducing flow duct and from fluid flowing in the flow path by the diaphragm, the pressure chamber adapted to receive fluid from a supply tube to build pressure therein to deflect the diaphragm a distance (D) to vary emission rate of fluid from the emitter outlet depending on supply tube pressure;

wherein the interior surface of the housing defines a raised region defining at least in part the elongated channel and the raised region engaging the diaphragm to form the pressure chamber;

wherein the elongated channel extends centrally and longitudinally along the interior surface of the housing and includes a stop to divide the channel into two sub-channels;

wherein the pressure chamber is situated in the interior surface of the housing to overlay the unobstructed central region of the pressure reducing flow duct and to deflect the diaphragm into at least the unobstructed central region depending on supply tube pressure.

2. A drip emitter comprising:

a housing defining an emitter inlet and an emitter outlet downstream of the emitter inlet, the emitter inlet adapted to receive fluid under pressure from a supply tube and the emitter outlet adapted to emit fluid;

a flow path extending through the housing from the emitter inlet to the emitter outlet, the flow path including a pressure reducing flow duct;

the pressure reducing flow duct comprising:

a duct inlet and a duct outlet located downstream of the duct inlet and having an unobstructed central region with a width (R);

a first set of baffles located adjacent to one side of the central region and a second set of baffles located adjacent to the other side of the central region, each baffle having a pair of side wall portions with the baffles of each set extending from a common wall and with each baffle terminating in a baffle edge;

wherein the one side of the central region is defined by a first generally linear imaginary line connecting the edges of the first set of baffles and the other side of the central region is defined by a second generally linear imaginary line connecting the edges of the second set of baffles and wherein (R) is the minimum distance between the first and second imaginary lines; and a first set of flow recesses defined by the first set of baffles adjacent to one side of the central region and a second set of flow recesses defined by the second set of baffles adjacent to the other side of the central region, each flow recess defined at least in part by opposing side wall portions from successive baffles;

a diaphragm overlaying and forming at least a portion of the pressure reducing flow duct;

a pressure chamber defined by at least one elongated channel in an interior surface of the housing and by the diaphragm, and separated from the pressure reducing flow duct and from fluid flowing in the flow path by the diaphragm, the pressure chamber adapted to receive fluid from a supply tube to build pressure therein to deflect the diaphragm a distance (D) to vary emission rate of fluid from the emitter outlet depending on supply tube pressure;

a metering chamber disposed within the flow path between the duct outlet and the emitter outlet; and a metering surface defining in part the metering chamber, the metering surface defining a groove extending through the metering chamber to the emitter outlet;

wherein the elongated channel extends centrall and longitudinally along the interior surface of the housing and includes a stop to divide the channel into two sub-channels.

3. A drip emitter comprising:

a housing defining an emitter inlet and an emitter outlet downstream of the emitter inlet, the emitter inlet adapted to received fluid under pressure from a supply tube and the emitter outlet adapted to emit fluid;

a flow path extending through the housing from the emitter inlet to the emitter outlet, the flow path including a pressure reducing flow duct;

the pressure reducing flow duct comprising:

a duct inlet and a duct outlet located downstream of the duct inlet and having an unobstructed central region with a width (R);

a first set of baffles located adjacent to one side of the central region and a second set of baffles located adjacent to the other side of the central region, each baffle having a pair of side wall portions with the baffles of each set extending from a common wall and with each baffle terminating in a baffle edge;

wherein the one side of the central region is defined by a first generally linear imaginary line connection the edges of the first set of baffles and the other side of the central region is defined by a second generally linear imaginary line connecting the edges of the second set of baffles and wherein (R) is the minimum distance between the first and second imaginary lines; and a first set of flow recesses defined by the first set of baffles adjacent to one side of the central region and a second set of flow recesses defined by the second set of baffles adjacent to the other side of the central region, each flow recess defined at least in part by opposing side wall portions from successive baffles;

a diaphragm overlaying and forming at least a portion of the pressure reducing flow duct;

a pressure chamber defined by at least one elongated channel in an interior surface of the housing and by the diaphragm, and separated from the pressure reducing flow duct and from fluid flowing in the flow path by the diaphragm, the pressure chamber adapted to receive fluid from a supply tube to build pressure therein to deflect the diaphragm a distance (D) to very emission rate of fluid from the emitter outlet depending on supply tube pressure;

a metering chamber disposed within the flow path between the duct outlet and the emitter outlet; and a metering surface defining in part the metering chamber, the metering surface defining a groove extending through the metering chamber to the emitter outlet;

wherein the housing comprises a raised rim configured for mounting the drip emitter to the supply tube, the mounting of the raised rim to the supply tube defining a flow path between the emitter outlet and an outlet in the supply tube;

wherein the housing comprises a base member and a cover member, one of the base and cover members including a plurality of arms defining slots for receiving a plurality of complementary shaped tabs of the other of the base and cover members in a dovetail arrangement; and wherein the interior surface of the housing defines a raised region defining at least in part the elongated channel and the raised region engages said diaphragm to form said pressure chamber;

wherein the elongated channel extends centrally and longitudinally along the interior surface of said housing and includes a stop to divide the channel into two sub-channels.

4. The drip emitter of claim 3 wherein the base member defines a perimeter having two longitudinal sides and wherein the plurality of arms are disposed along the longitudinal sides.

5. The drip emitter of claim 4 wherein the perimeter of the base member defines a face and wherein the plurality of arms extend in a direction perpendicular to the face.

6. The drip emitter of claim 3 wherein the cover member defines a perimeter having two longitudinal sides and wherein the plurality of tabs are disposed along the longitudinal sides.

7. The drip emitter of claim 6 wherein the plurality of tabs are formed within recesses spaced along the two longitudinal sides.

8. The drip emitter of claim 3 wherein the base member and cover member are fastened to one another by heat bonding the plurality of tabs to the plurality of arms.

* * * * *

UNITED STATES PATENT AND TRADEMARK OFFICE
CERTIFICATE OF CORRECTION

| | | |
|---|---|---|
| PATENT NO. | : 8,302,887 B2 | Page 1 of 1 |
| APPLICATION NO. | : 11/394755 | |
| DATED | : November 6, 2012 | |
| INVENTOR(S) | : Joshua Park et al. | |

It is certified that error appears in the above-identified patent and that said Letters Patent is hereby corrected as shown below:

TITLE PAGE:

Column 2, item (56), Other Publications, line 1, delete "Netfim NAM" and insert --Netafim RAM-- therefor.

PAGE 3:

Column 2, item (56), Other Publications, line 22, delete "Jaffee" and insert --Jaffe-- therefor.

IN THE CLAIMS:

Column 8, line 34, in claim 2, delete "centrall" and insert --centrally-- therefor.

Column 8, line 41, in claim 3, delete "received" and insert --receive-- therefor.

Column 8, line 57, in claim 3, delete "connection" and insert --connecting-- therefor.

Column 9, line 12, in claim 3, delete "very" and insert --vary-- therefor.

Column 10, line 1, in claim 3, delete "complementary" and insert --complementarily-- therefor.

Signed and Sealed this
Fifth Day of May, 2015

Michelle K. Lee
*Director of the United States Patent and Trademark Office*